US011220357B2

(12) United States Patent
Best et al.

(10) Patent No.: US 11,220,357 B2
(45) Date of Patent: Jan. 11, 2022

(54) AIRCRAFT MAINTENANCE SYSTEMS AND METHODS

(71) Applicant: The Boeing Company, Chicago, IL (US)

(72) Inventors: Timothy A. Best, Everett, WA (US); Ravin R. Pierre, Everett, WA (US); Hamid R. Nikjou, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 189 days.

(21) Appl. No.: 16/252,552

(22) Filed: Jan. 18, 2019

(65) Prior Publication Data

US 2020/0231307 A1 Jul. 23, 2020

(51) Int. Cl.
*B64F 5/60* (2017.01)
*B64D 45/00* (2006.01)
*F01D 21/00* (2006.01)
*G01L 15/00* (2006.01)

(52) U.S. Cl.
CPC ............. *B64F 5/60* (2017.01); *B64D 45/00* (2013.01); *F01D 21/003* (2013.01); *G01L 15/00* (2013.01); *B64D 2045/0085* (2013.01); *F05D 2260/80* (2013.01)

(58) Field of Classification Search
CPC ............. B64F 5/60; F05D 2260/80; B64D 2045/0085; B64D 45/00; G01L 15/00; F01D 21/003
See application file for complete search history.

(56) References Cited

U.S. PATENT DOCUMENTS

| 3,104,522 A | 9/1963 | Pennington et al. |
| 8,060,334 B1 * | 11/2011 | Jarvinen ................ B64D 15/12 |
| | | 702/136 |
| 8,718,955 B2 * | 5/2014 | Golly ..................... G01P 5/165 |
| | | 702/50 |

(Continued)

FOREIGN PATENT DOCUMENTS

| EP | 2 273 275 | 1/2011 |
| GB | 2 418 739 | 4/2006 |

OTHER PUBLICATIONS

Extended European Search Report prepared by the European Patent Office in application No. EP 19 21 2704.1 dated Jun. 22, 2020.

*Primary Examiner* — Hunter B Lonsberry
*Assistant Examiner* — Mathew Franklin Gordon
(74) *Attorney, Agent, or Firm* — McDonnell Boehnen Hulbert & Berghoff LLP

(57) ABSTRACT

In an example, a method for on-board maintenance of an aircraft is described. The method includes measuring, by a pressure sensor, a pressure in a tube associated with an engine of an aircraft. The method also includes determining, by a control system and based on the pressure measured by the pressure sensor, that the tube is at least partially blocked by moisture. Additionally, the method includes, responsive to determining that the tube is at least partially blocked by the moisture, providing an alert signal from the control system to a flight deck of the aircraft. The method also includes, responsive to the alert signal, operating an actuation switch at the flight deck to actuate a valve to an open state. The method further includes, responsive to actuating the valve to the open state, supplying an inert gas from an inert gas supply to the tube to expel the moisture.

20 Claims, 8 Drawing Sheets

(56) References Cited

U.S. PATENT DOCUMENTS

| | | | | |
|---|---|---|---|---|
| 2009/0301601 A1* | 12/2009 | Enerson | .................. | C06D 5/06 |
| | | | | 141/38 |
| 2012/0118037 A1 | 5/2012 | Leblond et al. | | |
| 2014/0061010 A1* | 3/2014 | Dixon | .................... | H01H 9/287 |
| | | | | 200/43.16 |
| 2014/0096618 A1* | 4/2014 | Ellison | ...................... | G01P 5/14 |
| | | | | 73/861.65 |
| 2016/0370400 A1* | 12/2016 | Jacob | ...................... | G01P 5/165 |
| 2017/0228994 A1* | 8/2017 | Rogers | .................. | G08B 17/04 |
| 2018/0066595 A1 | 3/2018 | Dudar et al. | | |

* cited by examiner

AIRCRAFT MAINTENANCE SYSTEMS AND METHODS

FIELD

The present disclosure generally relates to maintenance systems and methods for an aircraft, and more particularly to systems and methods for mitigating accumulation of moisture for an aircraft.

BACKGROUND

Prior to take-off, an aircraft may be evaluated to determine whether any maintenance should be performed. In some instances, a condition may be identified and maintenance personnel may perform maintenance, repair, and/or overhaul operations to improve a condition of the aircraft. In general, such maintenance, repair, and/or overhaul operations can be time consuming, which can lead to a delayed departure and/or undesirably long downtimes.

SUMMARY

In an example, an aircraft on-board maintenance system is described. The aircraft on-board maintenance system includes a pressure sensor configured to measure a pressure in a tube associated with an engine of an aircraft and generate a sensor signal indicative of the pressure measured by the pressure sensor. The aircraft on-board maintenance system also includes a valve comprising an inlet coupled to an inert gas supply on-board the aircraft and an outlet coupled to a conduit extending to the tube, wherein the valve is actuatable between: (i) an open state in which the valve supplies, via the conduit, an inert gas from the inert gas supply to the tube, and (ii) a closed state in which the valve inhibits supply of the inert gas.

The aircraft on-board maintenance system further includes a control system in communication with the pressure sensor and configured to receive the sensor signal. The control system is configured to: (i) determine, based on the sensor signal, that the tube is at least partially blocked by moisture, and (ii) responsive to a determination that the tube is at least partially blocked by moisture, provide an alert signal to a flight deck of the aircraft. The aircraft on-board maintenance system also includes an actuation switch at the flight deck that is operable to actuate the valve to the open state to supply the inert gas to the conduit and expel the moisture in the tube.

In another example, a method for on-board maintenance of an aircraft is described. The method includes measuring, by a pressure sensor, a pressure in a tube associated with an engine of an aircraft. The method also includes determining, by a control system and based on the pressure measured by the pressure sensor, that the tube is at least partially blocked by moisture. Additionally, the method includes, responsive to determining that the tube is at least partially blocked by the moisture, providing an alert signal from the control system to a flight deck of the aircraft. The method further includes, responsive to the alert signal, operating an actuation switch at the flight deck to actuate a valve to an open state. The method also includes, responsive to actuating the valve to the open state, supplying, via the valve and a conduit, an inert gas from an inert gas supply to the tube to expel the moisture from the tube.

In another example, an aircraft on-board maintenance system is described. The aircraft on-board maintenance system includes a pressure sensor configured to measure a pressure in a tube associated with an engine of an aircraft and generate a sensor signal indicative of the pressure measured by the pressure sensor. The aircraft on-board maintenance system also includes a valve comprising an inlet coupled to an inert gas supply on-board the aircraft and an outlet coupled to a conduit extending to the tube. The valve is actuatable between: (i) an open state in which the valve supplies, via the conduit, of an inert gas from the inert gas supply to the tube, and (ii) a closed state in which the valve inhibits supply of the inert gas.

The aircraft on-board maintenance system also includes a moisture sensor that is configured to sense moisture in the tube and generate a moisture sensor signal indicative of a presence of the moisture in the tube. Additionally, the aircraft on-board maintenance system includes a control system in communication with the moisture sensor and configured to receive the moisture sensor signal. The control system is configured to: (i) determine, based on the moisture sensor signal, that the tube is at least partially blocked by the moisture, and (ii) responsive to a determination that the tube is at least partially blocked by the moisture, provide an alert signal to a flight deck of the aircraft. The aircraft on-board maintenance system further includes an actuation switch at the flight deck and operable to actuate the valve to the open state to supply the inert gas to the conduit and expel the moisture in the tube.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As noted above, maintenance operations performed by maintenance personnel can be time consuming and lead to delayed flights and/or unduly long downtimes. In some instances, moisture may accumulate in a tube associated with an engine of an aircraft. The accumulated moisture may at least partially block the tube, and the maintenance personnel may perform maintenance operations to clear the blockage from the tube prior to take-off. Typically, a maintenance operation to clear a blockage in the tube may involve: (i) driving an air truck to the aircraft, (ii) disconnecting one or more tubes on the aircraft, (iii) reconnecting the tube(s) to the air truck, (iv) supplying air from the air truck to the tubes to clear the blockage, (v) disconnecting the tubes from the air truck, and (vi) reconnecting the tubes to the aircraft. This process can be particularly time consuming. Moreover, in instances in which the blockage is discovered during taxi-out, the aircraft generally must return to the gate to address the blockage. This further exacerbates the time required to clear the blockage.

Example systems and methods described herein can beneficially address at least some drawbacks of existing aircraft maintenance systems and processes. Within examples, an aircraft on-board maintenance system is described. The aircraft on-board maintenance system can determine when a blockage occurs in the tube and responsively clear the blockage by supplying inert gas from an inert gas supply to the tube. The aircraft on-board maintenance system can include a valve that is manually and/or automatically operable to supply the inert gas to the tube responsive to a determination that the tube is at least partially blocked. Accordingly, the aircraft on-board maintenance system can clear the blockage in the tube more rapidly and efficiently than existing systems and processes.

Figure 1:
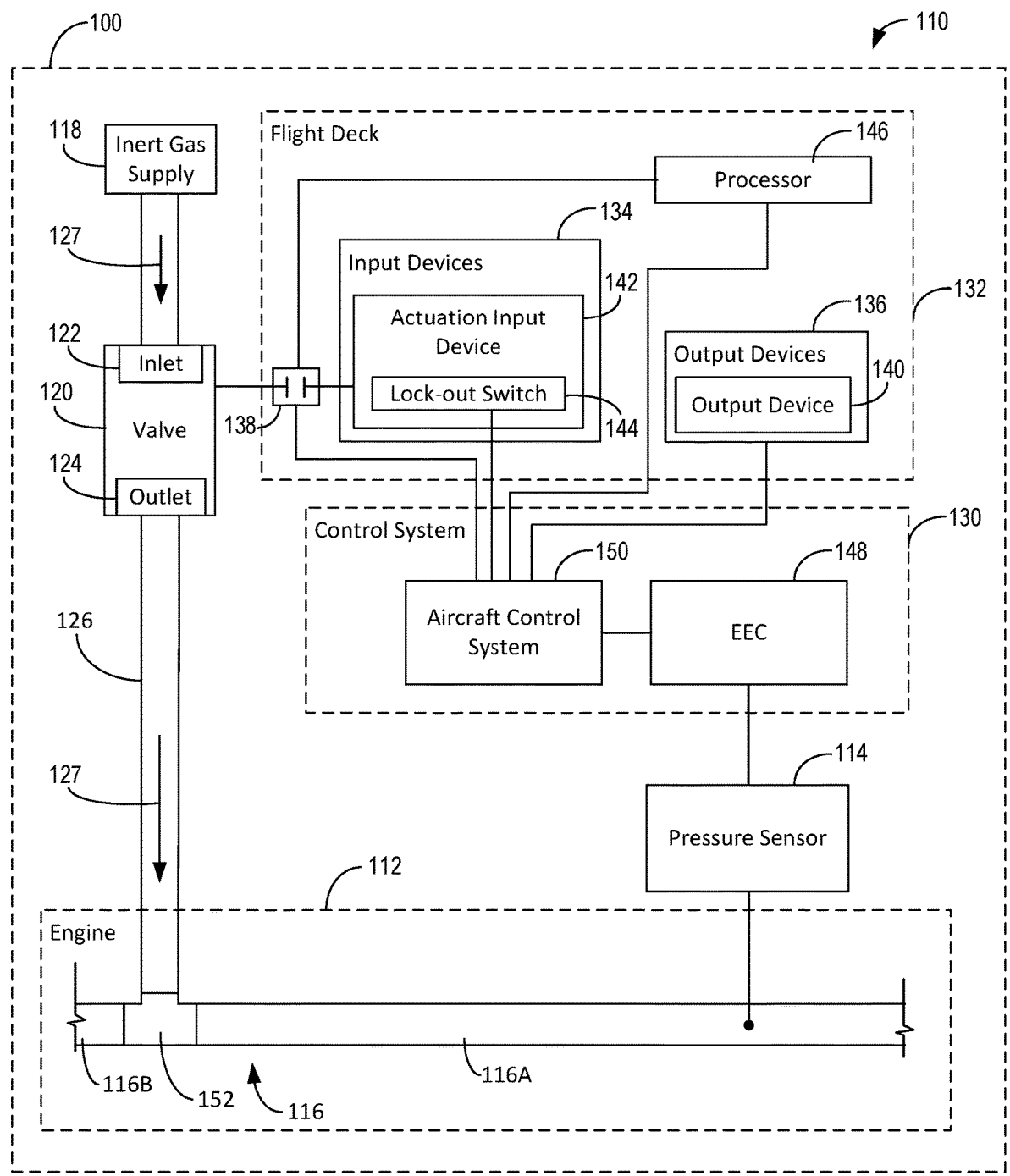
FIG. 1 illustrates a simplified block diagram of an aircraft on-board maintenance system, according to an example embodiment.

Referring now to FIG. 1, a simplified block diagram of an aircraft on-board maintenance system 100 is illustrated according to an example embodiment. In FIG. 1, the aircraft on-board maintenance system 100 can be onboard an aircraft 110. Within examples, the aircraft 110 can be an airplane, a helicopter, and/or an unmanned aerial vehicle (UAV). More generally, the aircraft 110 can be any aerial vehicle that includes an engine 112, which can provide propulsion for the aerial vehicle. The engine 112 can be, for instance, a piston engine, a gas turbine engine (e.g., a turboprop engine, a turboshaft engine, and/or a jet engine), and/or a reaction engine (e.g., a turbojet engine, a turbofan engine, and/or a pulsejet engine).

As shown in FIG. 1, the aircraft on-board maintenance system 100 includes a pressure sensor 114 that can measure a pressure in a tube 116 associated with the engine 112 of the aircraft 110 and generate a sensor signal indicative of the pressure measured by the pressure sensor 114. In one example, the tube 116 can be arranged to receive air into the tube 116 at an inlet of the engine 112 to facilitate the pressure sensor 114 measuring an engine inlet pressure (e.g., the tube 116 and the pressure sensor 114 can be arranged as a P20 probe).

In some instances, moisture may accumulate in the tube 116 before, during, or after a flight of the aircraft 110. As examples, moisture may accumulate when the aircraft 110 flies through a cloud and/or as a result of condensation while the aircraft 110 is on the ground. Depending on the ambient temperature, the accumulated moisture may remain in liquid or freeze into an ice structure within the tube 116. In either case, the accumulated moisture may form at least a partial blockage in the tube 116. Thus, in some instances, the blockage of the tube 116 by the accumulated moisture may affect the pressure measured by the pressure sensor 114.

As shown in FIG. 1, the aircraft on-board maintenance system 100 can also include an inert gas supply 118 on the aircraft 110. The inert gas supply 118 can contain an inert gas such as, for example, a nitrogen gas. Additionally, in FIG. 1, a valve 120 can include an inlet 122 coupled to the inert gas supply 118 on-board the aircraft 110 and an outlet 124 coupled to a conduit 126 extending to the tube 116 associated with the engine 112. Within examples, the valve 120 is actuatable between: (i) an open state in which the valve 120 supplies, via the conduit 126, the inert gas from the inert gas supply 118 to the tube 116, and (ii) a closed state in which the valve 120 inhibits supply of the inert gas from the inert gas supply 118 to the conduit 126. Also, within examples, the valve 120 can be a one-way valve such that, in the open state, the valve 120 supplies the inert gas in a direction indicated by arrows 127 in FIG. 1 (i.e., in a direction from the inert gas supply 118 towards the tube 116) and inhibits a flow of gas and/or fluids in an opposite direction (i.e., in a direction from the tube 116 toward the inert gas supply 118).

In this arrangement, the inert gas supply 118 can supply the inert gas, via the valve 120 and the conduit 126, the inert gas to the tube 116 to expel the moisture from the tube 116. In one implementation, the inert gas supply 118 is configured to supply the inert gas along the conduit 126 at a pressure of at least approximately 40 pounds per square inch (PSI).

As shown in FIG. 1, the aircraft on-board maintenance system 100 can also include a control system 130 in communication with the pressure sensor 114. As such, the control system 130 can receive the sensor signal indicative of the pressure measured by the pressure sensor 114.

Within examples, the control system 130 can determine, based on the sensor signal, that the tube is at least partially blocked by moisture. For instance, in one implementation, to determine that the tube is at least partially blocked by the moisture, the control system 130 can perform a comparison of the pressure measured by the pressure sensor 114 to a range of threshold values and determine, based on the comparison, that the pressure measured by the pressure sensor 114 is outside of the range of threshold values. The range of threshold values can be related to a range of pressures that are expected during normal operation of the aircraft 110. As examples, the threshold values can be based on a size of the tube 116, and/or a state of the aircraft (e.g., a power on state, a pre-flight state, an engine start state, an in-gate state, a taxi-out state, a takeoff state, a climb state, a cruise state, a descent state, an approach state, a rollout state, a taxi-in state, a go around state, an engine shutdown state, and/or a maintenance state). Then, responsive to a determination that the pressure measured by the pressure sensor 114 is outside of the range of threshold values, the control system 130 can determine that the tube 116 is at least partially blocked by the moisture.

Additionally, responsive to a determination that the tube 116 is at least partially blocked by moisture, the control system 130 can provide an alert signal to a flight deck 132 of the aircraft 110. The flight deck 132 can include a plurality of input devices 134 and output devices 136 for operating the aircraft 110. For instance, the input devices 134 can include one or more buttons, joysticks, levers, switches, yokes, and/or pedals for operating the aircraft 110. Additionally, for instance, the output devices 136 can include one or more displays, gauges, instruments, indicator lights, and/or speakers to provide information and/or generate a notification to a pilot at the flight deck 132.

As shown in FIG. 1, aircraft on-board maintenance system 100 can include an actuation switch 138 at the flight deck 132 that is operable to actuate the valve 120 to the open state to supply the inert gas to the conduit 126 and expel the moisture in the tube 116. In one example, the output devices 136 can include an output device 140 at the flight deck 132 can be in communication with the control system 130. The output device 140 can generate a notification at the flight deck 132 responsive to the alert signal from the control system 130. Within examples, the notification can include at least one of an auditory notification, a visual notification, or a haptic notification indicating that the tube 116 is at least partially blocked. The input devices 134 can include an actuation input device 142 that is operable to actuate the actuation switch 138. In this arrangement, responsive to the output device 140 generating the notification, the actuation input device 142 can be operated to actuation switch 138, which in turn actuates the valve 120 from the closed state to the open state. Thus, in this example, the actuation switch 138 can be manually operable in response to the notification generated by the output device 140.

In one implementation, the aircraft on-board maintenance system 100 can be configured to inhibit actuation of the valve 120 to the open state absent the control system 130 detecting that the tube 116 is at least partially blocked. For instance, in FIG. 1, the aircraft on-board maintenance system 100 can include a lock-out switch 144 in communication with the control system 130 and the actuation switch 138. The lock-out switch 144 can be configured to (i) disable the actuation switch 138 prior to the flight deck 132 receiving the alert signal from the control system 130 and (ii) enable the actuation switch 138 responsive to the flight deck 132 receiving the alert signal from the control system 130. The lock-out switch 144 can beneficially assist in mitigating inadvertent actuation of the valve 120 and supply of inert gas from the inert gas supply 118 to the tube 116.

In another example, the aircraft on-board maintenance system 100 can additionally or alternatively provide for automatic actuation of the valve 120 responsive to the control system 130 detecting the at least a partial blockage of the tube 116. For instance, the aircraft on-board maintenance system 100 can include a processor 146 at the flight deck 132 that is configured to automatically operate the actuation switch 138 responsive to the alert signal received from the control system 130. This can beneficially provide for more rapidly clearing the blockage in the tube 116 and/or reduce a workload on a pilot of the aircraft 110.

Additionally, within examples, the aircraft on-board maintenance system 100 can determine when the blockage is cleared from the tube 116. In an example, the pressure sensor 114 can measure a second pressure in the tube 116 and generate a second sensor signal indicative of the second pressure measured by the pressure sensor 114. Also, the control system 130 can (i) perform a second comparison of the second pressure indicated by the second sensor signal to the range of threshold values, (ii) determine, based on the second comparison, that the second pressure indicated by the second sensor signal is within the range of threshold values, and (iii) responsive to a determination that the second pressure is within the range of threshold values, determine that the tube 116 is cleared of the moisture.

In one example, responsive to the control system 130 determining that the tube 116 is cleared of the moisture, the control system 130 can provide a blockage-cleared signal to the flight deck 132 and, responsive to the blockage-cleared signal, the valve 120 can actuate from the open state to the closed state. As such, aircraft on-board maintenance system 100 can be configured to cease supplying the inert gas from the inert gas supply 118 to the tube 116 when the blockage is cleared. This can help to conserve and more efficiently use the inert gas within the inert gas supply.

In one implementation, responsive to the blockage-cleared signal, the processor 146 at the flight deck 132 can actuate the valve 120 to the closed state responsive to the blockage-cleared signal. In one implementation, responsive to the blockage-cleared signal, the output device 140 can generate a second notification to indicate that the moisture is cleared from the tube 116. For instance, the second notification can include at least one of an auditory notification, a visual notification, or a haptic notification indicating that the tube 116 was cleared of the blockage. In an implementation in which the actuation switch 138 is manually operable, the second notification can indicate that the pilot can cease operation of the actuation switch 138.

As described above, the control system 130 can control operation of the aircraft on-board maintenance system 100. Within examples, the control system 130 can be implemented using hardware, software, and/or firmware. For instance, the control system 130 can include one or more processors and a non-transitory computer readable medium (e.g., volatile and/or non-volatile memory) that stores machine language instructions or other executable instructions. The instructions, when executed by the one or more processors, cause the aircraft on-board maintenance system 100 to carry out the various operations described herein. The control system 130, thus, can receive data and store the data in the memory as well.

Also, within examples, as shown in FIG. 1, the control system 130 can additionally carry out other operations of the aircraft 110. For instance, as shown in FIG. 1, the control system 130 can include an electronic engine controller (EEC) 148 in communication with an aircraft control system 150.

Within examples, the EEC 148 can be a full authority digital engine control (FADEC), or the EEC 148 can provide for manual override of certain operations. In general, the EEC 148 can operate to carry out engine performance control and monitoring operations. For instance, the EEC 148 can receive inputs from a plurality sensors of the aircraft 110 (including the pressure sensor 114), which can sense conditions related to operation and performance of the engine 112. As examples, the sensors can sense and the EEC 148 can receive inputs relating to air density, throttle lever position, ambient temperature, air speed and altitude, exhaust gas temperature, oil temperature, high pressure turbine shroud temperature, engine fuel flow, core speed, an engine inlet pressure (P0) and an engine inlet temperature (T12) measured upstream of the fan at the engine inlet, and a compressor discharge temperature (T3) and a compressor discharge pressure (P3) measured downstream of the engine high pressure compressor, a turbine exhaust pressure, fan speed, and/or other engine parameters. Based on the inputs from the sensors, the EEC 148 can generate command signals to operate one or more engine actuators such as, for instance, hydro-mechanical units (not shown) that meter a flow of fuel to the engine 112.

The aircraft control system 150 can carry out aircraft and flight control operations. For example, the aircraft control system 150 can perform operations related to a flight data network, an electronic flight bag, a mode control panel at the flight deck 132 of the aircraft 110, a primary flight display at the flight deck 132, a navigation display at the flight deck 132, a flight management system, and/or flight control. Also, as described in further detail below, the aircraft control system 150 can receive information from the EEC 148 and provide an alert to the flight deck 132 (e.g., information and/or alerts related to conditions sensed by the sensors in communication with the EEC 148).

In one implementation, the EEC 148 can (i) receive an indication of the pressure measured by the pressure sensor 114, (ii) determine, based on the pressure measured by the pressure sensor 114, that the tube 116 is at least partially blocked by the moisture, and (iii) responsive to the determination that the tube 116 is at least partially blocked by the moisture, generate a blockage-detected signal. The aircraft control system 150 can receive the blockage-detected signal from the EEC 148 and, responsive to the blockage-detected signal, provide the alert signal to the flight deck 132.

The EEC 148 and/or the aircraft control system 150 can be implemented using hardware, software, and/or firmware. For instance, EEC 148 and/or the aircraft control system 150 can include one or more processors and a non-transitory computer readable medium (e.g., volatile and/or non-volatile memory) that stores machine language instructions or other executable instructions. The instructions, when executed by the one or more processors, cause the EEC 148 and/or the aircraft control system 150 to carry out the various operations described herein. The EEC 148 and/or the aircraft control system 150, thus, can receive data and store the data in the memory as well.

Also, within examples, the aircraft on-board maintenance system 100 can include a fitting 152 that couples a first portion 116A of the tube 116, a second portion 116B of the tube 116, and the conduit 126. The pressure sensor 114 can measure the pressure in the first portion 116A of the tube 116. The fitting 152 can direct the inert gas from the conduit 126 toward the first portion 116A of the tube 116. For example, the fitting 152 can be a T-shaped fitting. In this arrangement, fitting 152 can help to direct the inert gas toward the moisture accumulated in the first portion 116A of the tube 116 in which the pressure sensor 114 measures the pressure.

Figure 2:
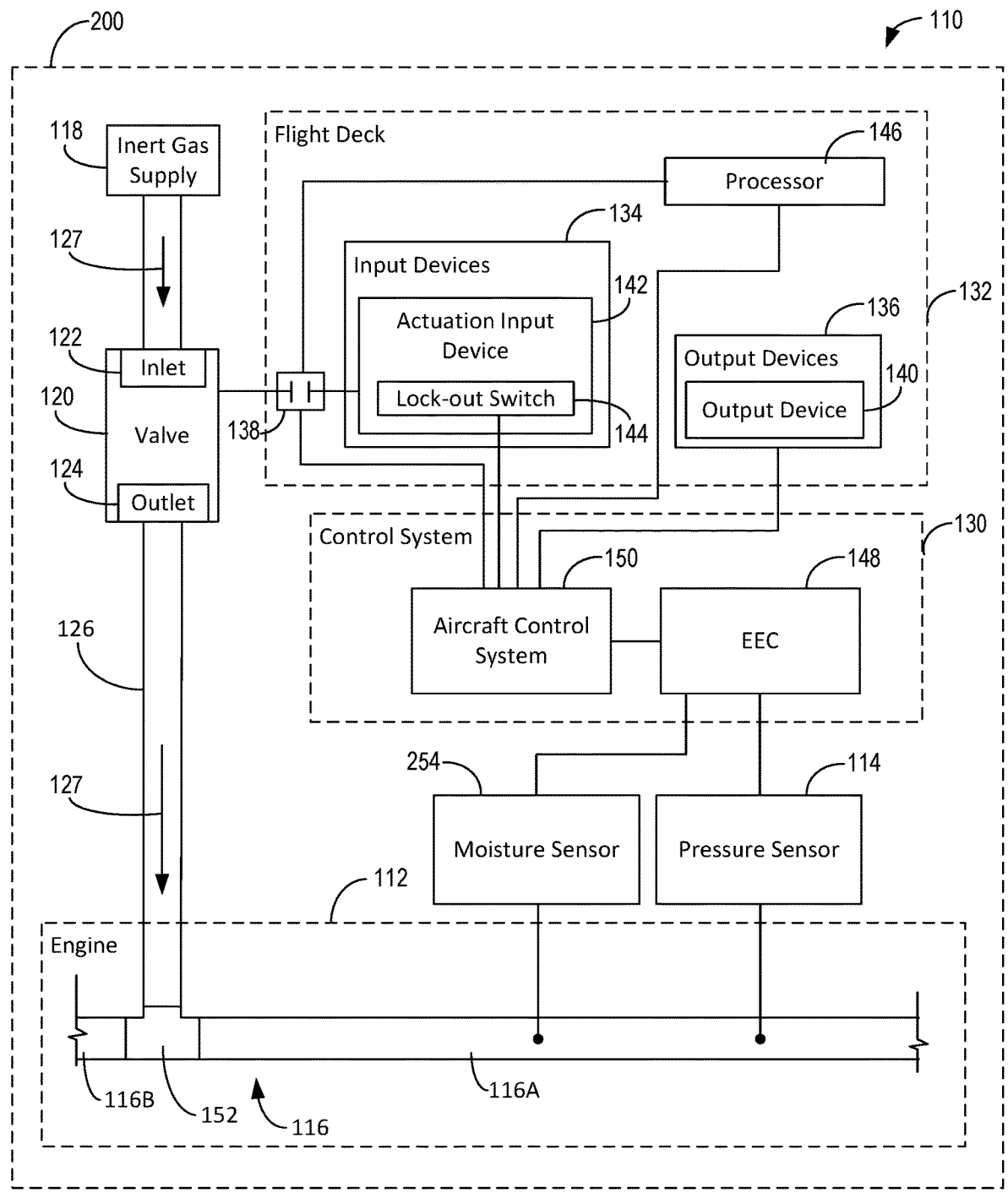
FIG. 2 illustrates a simplified block diagram of an aircraft on-board maintenance system, according to an example embodiment.

Referring now to FIG. 2, an aircraft on-board maintenance system 200 is illustrated according to another example embodiment. The aircraft on-board maintenance system 200 of FIG. 2 is substantially similar to the aircraft on-board maintenance system 100 shown in FIG. 1. For example, the aircraft on-board maintenance system 200 includes the pressure sensor 114, the valve 120, the control system 130, and the actuation switch 138 onboard the aircraft 110 as described above. Additionally, for example, the aircraft on-board maintenance system 200 can include one or more input devices 134 and/or output devices 136 at the flight deck 132, a lock-out switch 144, a processor 146, the EEC 148, the aircraft control system 150, and/or the fitting 152 as described above.

The pressure sensor 114 can measure a pressure in a tube 116 associated with the engine 112 of the aircraft 110 and generate a sensor signal indicative of the pressure measured by the pressure sensor 114. The valve 120 includes the inlet 122 coupled to the inert gas supply 118 on-board the aircraft and the outlet 124 coupled to the conduit 126 extending to the tube 116. Additionally, the valve 120 is actuatable between: (i) an open state in which the valve 120 supplies, via the conduit 126, of an inert gas from the inert gas supply 118 to the tube 116, and (ii) a closed state in which the valve 120 inhibits supply of the inert gas.

As shown in FIG. 2, the aircraft on-board maintenance system 200 also includes a moisture sensor 254 that can sense moisture in the tube 116 and generate a moisture sensor signal indicative of a presence of the moisture in the tube 116. The control system 130 is in communication with the moisture sensor 254 and configured to receive the moisture sensor signal. The control system 130 can determine, based on the moisture sensor signal, that the tube 116 is at least partially blocked by the moisture. In one example, the moisture sensor 254 can generate the moisture sensor signal responsive to the moisture sensor 254 sensing at least a threshold amount of moisture in the tube 116. As an example, the moisture sensor 254 can include an optical moisture sensor (e.g., a laser-based sensor).

The control system 130 can also, responsive to a determination that the tube 116 is at least partially blocked by the moisture, provide the alert signal to the flight deck 132 of the aircraft 110. The actuation switch 138 at the flight deck 132 is operable to actuate the valve 120 to the open state to supply the inert gas to the conduit 126 and expel the moisture in the tube 116. Within examples, the actuation switch 138 can be manually and/or automatically operated to the open state, as described above. For instance, the processor 146 at the flight deck 132 can automatically operate the actuation switch 138 responsive to the alert signal received from the control system 130.

Additionally or alternatively, for instance, the output device 140 can provide a notification at the flight deck 132 responsive to the alert signal from the control system 130. Within examples, the notification can include at least one of an auditory notification, a visual notification, or a haptic notification indicating that the tube 116 is at least partially blocked. The input devices 134 can include an actuation input device 142 that is operable to actuate the actuation switch 138. In this arrangement, responsive to the output device 140 generating the notification, the actuation input device 142 can be operated to actuation switch 138, which in turn actuates the valve 120 from the closed state to the open state. Thus, in this example, the actuation switch 138 can be manually operable in response to the notification generated by the output device 140.

Additionally, within examples, the moisture sensor 254 can sense when the moisture is cleared from the tube 116 and provide to the flight deck 132 a moisture-cleared signal indicative of an absence of the moisture in the tube 116. The output device 140 can, responsive to the flight deck 132 receiving the moisture-cleared signal, provide the second notification to indicate that the moisture has been expelled from the tube 116.

Figure 3:
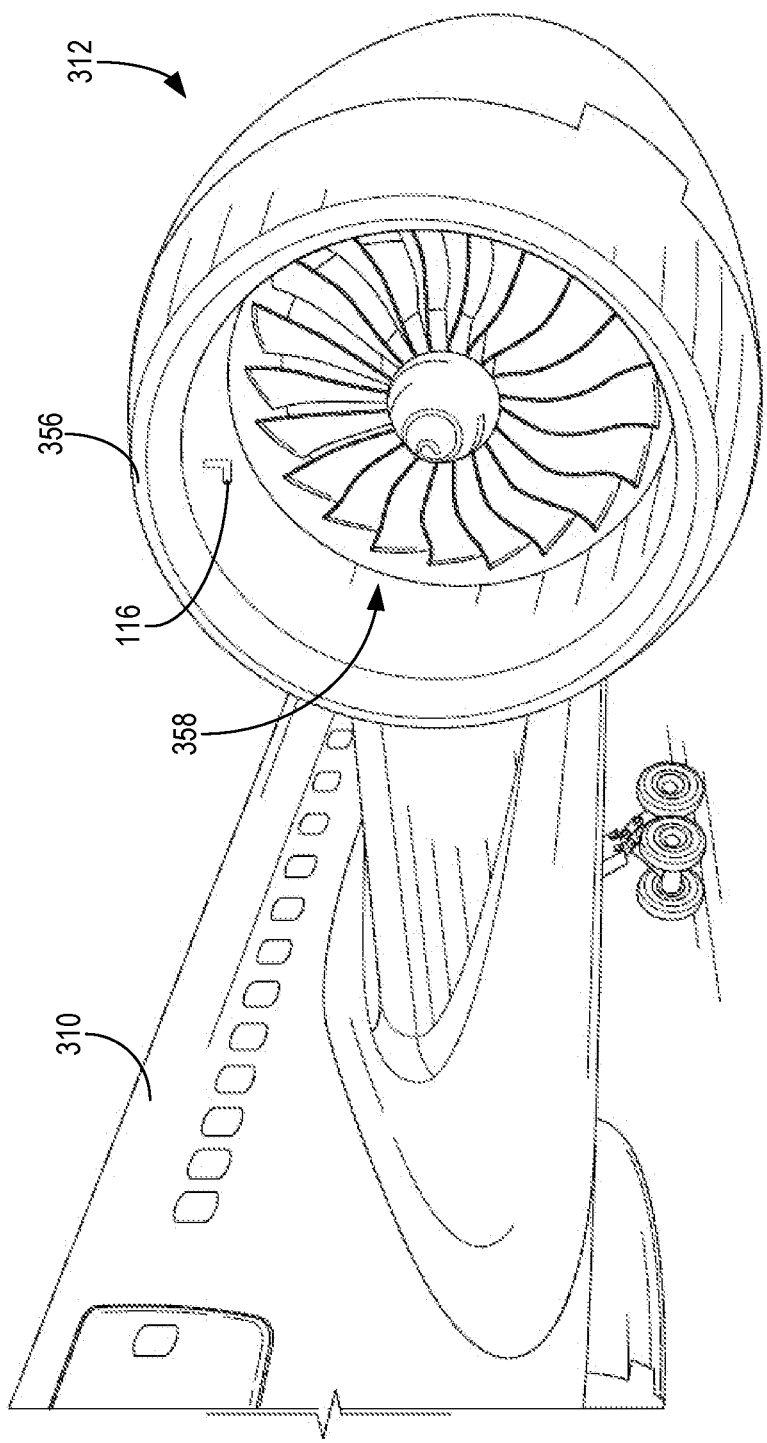
FIG. 3 depicts a perspective view of a tube associated with an engine of an aircraft according to an example embodiment.
Figure 4:
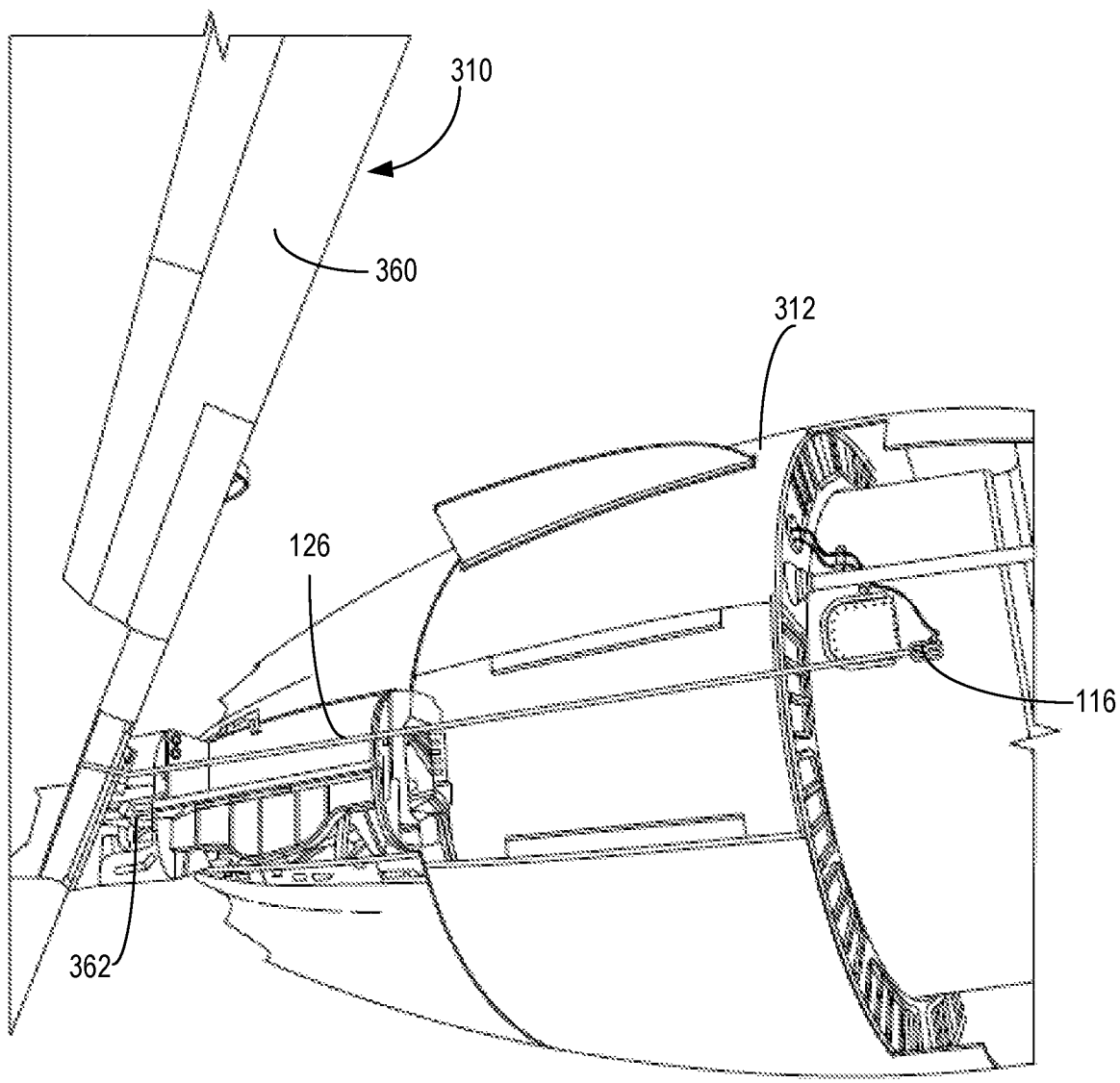
FIG. 4 depicts a partial sectional view of the engine shown in FIG. 3 according to the example embodiment

Referring now to FIGS. 3-4, an example location of the tube 116 and the conduit 126 are depicted according to one example embodiment. In particular, FIG. 3 depicts a perspective view of an engine 312 of an aircraft 310 according to an example embodiment, and FIG. 4 depicts a partial sectional view of the engine 312 according to the example embodiment. As shown in FIG. 3, at least a portion of the tube 116 can extend from a cowling 356 of the engine 312 at an engine inlet 358. As shown in FIG. 4, the conduit 126 can extend from a wing 360 of the aircraft 310 along a pylon 362 and along the engine 312 to the tube 116 at the location shown in FIG. 3.

Figure 5:
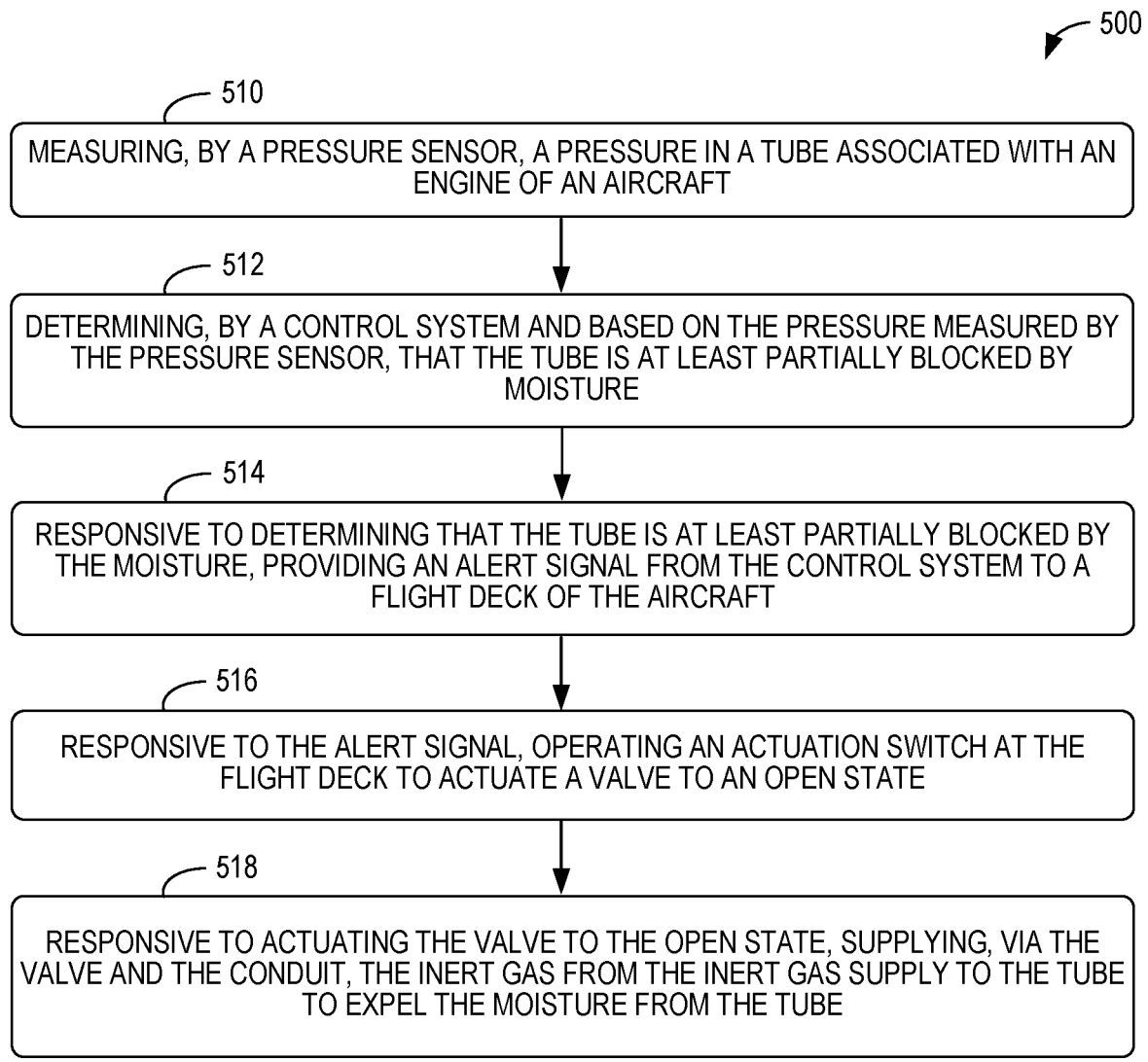
FIG. 5 illustrates a flow chart of an example process for on-board maintenance of an aircraft, according to an example embodiment.

Referring now to FIG. 500, a flowchart for a process 500 for on-board maintenance is illustrated according to an example embodiment. As shown in FIG. 5, at block 510, the process 500 includes measuring, by a pressure sensor, a pressure in a tube associated with an engine of an aircraft. At block 512, the process 500 includes determining, by a control system and based on the pressure measured by the pressure sensor, that the tube is at least partially blocked by moisture. Responsive to determining that the tube is at least partially blocked by the moisture at block 512, the process 500 includes providing an alert signal from the control system to a flight deck of the aircraft at block 514. Responsive to the alert signal at block 514, the process 500 includes operating an actuation switch at the flight deck to actuate a valve to an open state at block 516. Responsive to actuating the valve to the open state at block at block 516, the process 500 includes, supplying, via the valve and the conduit, the inert gas from the inert gas supply to the tube to expel the moisture from the tube at block 518.

Figure 6:
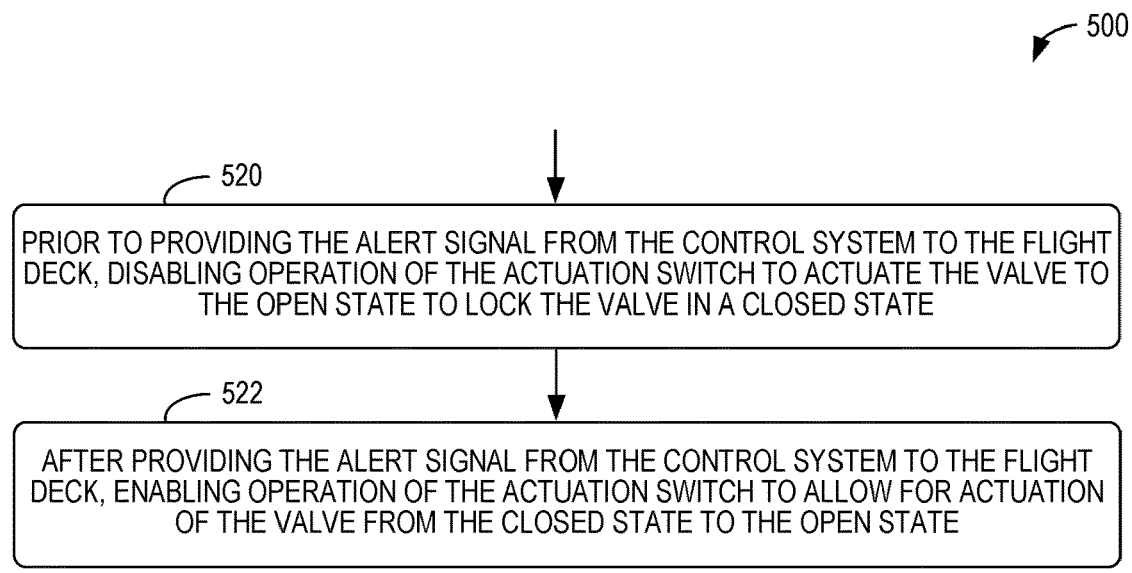
FIG. 6 illustrates a flow chart of an example process for on-board maintenance of an aircraft that can be used with the process shown in FIG. 5.

FIGS. 6-10 depict additional aspects of the process 500 according to further examples. As shown in FIG. 6, the process 500 can also include, prior to providing the alert signal from the control system to the flight deck at block 514, disabling operation of the actuation switch to actuate the valve to the open state to lock the valve in a closed state at block 520. Also, in FIG. 6, the process 500 can include, after providing the alert signal from the control system to the flight deck at block 514, enabling operation of the actuation switch to allow for actuation of the valve from the closed state to the open state at block 522.

Figure 7:
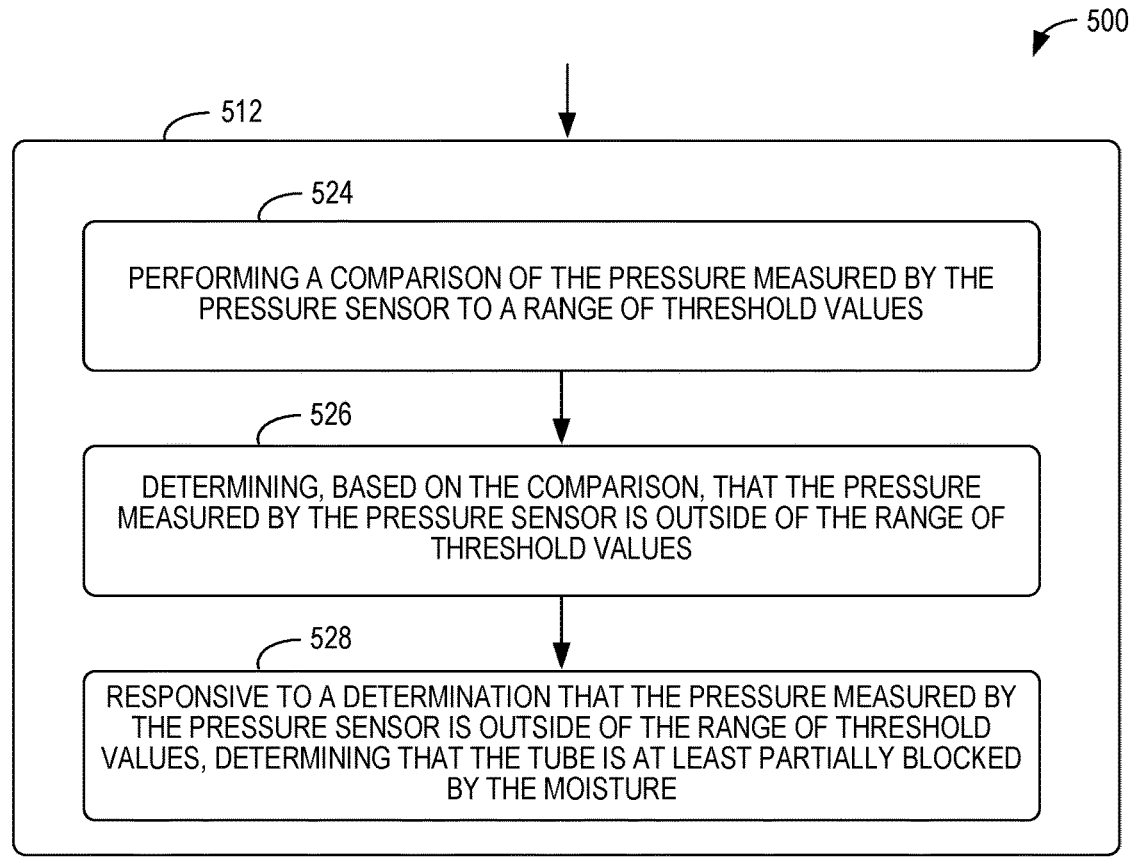
FIG. 7 illustrates a flow chart of an example process for on-board maintenance of an aircraft that can be used with the process shown in FIG. 5.

As shown in FIG. 7, determining that the tube is at least partially blocked by the moisture at block 512 can include (i) performing a comparison of the pressure measured by the pressure sensor to a range of threshold values at block 524, (ii) determining, based on the comparison, that the pressure measured by the pressure sensor is outside of the range of threshold values at block 526, and (iii) responsive to a determination that the pressure measured by the pressure sensor is outside of the range of threshold values at block 526, determining that the tube is at least partially blocked by the moisture at block 528.

Figure 8:
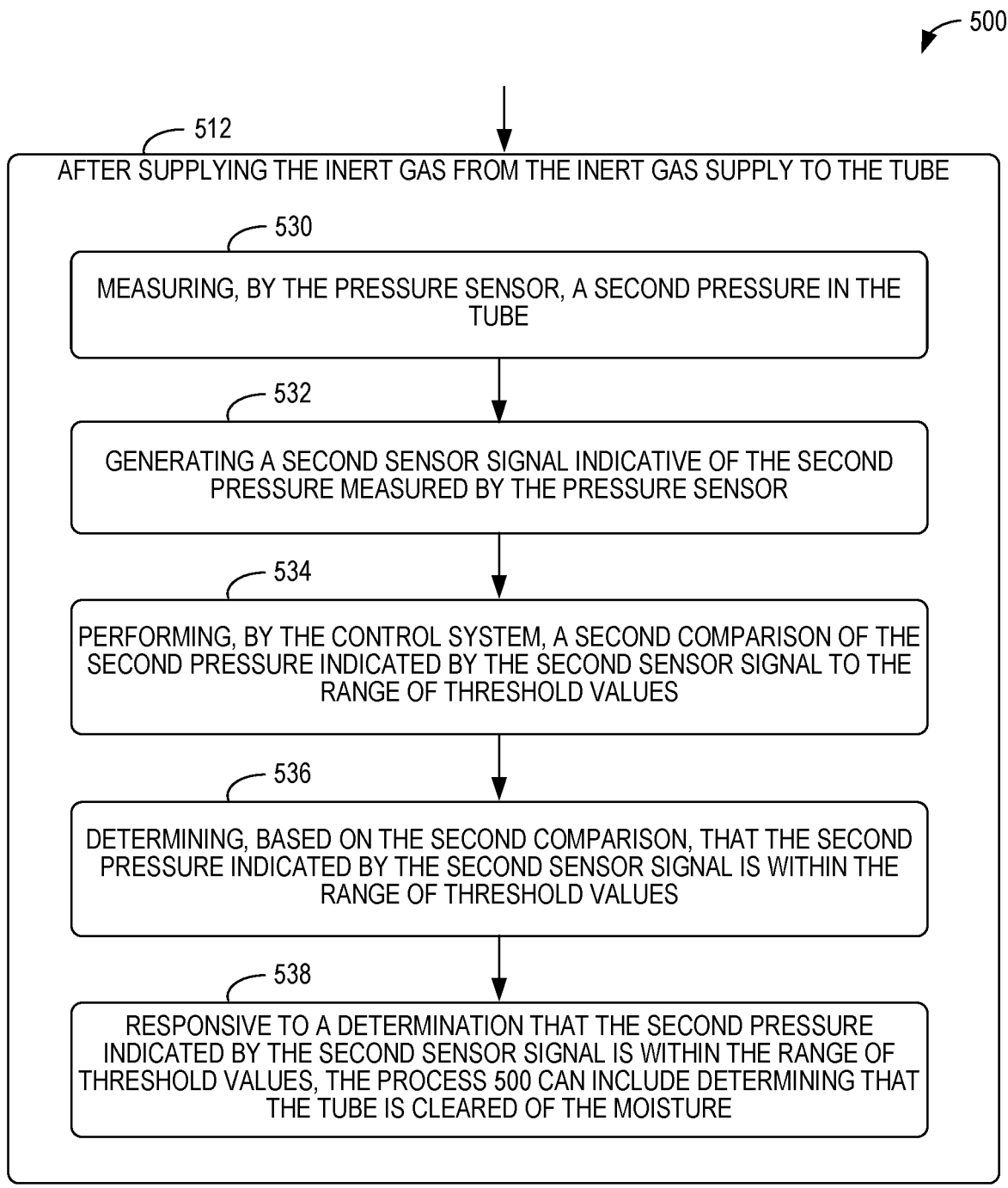
FIG. 8 illustrates a flow chart of an example process for on-board maintenance of an aircraft that can be used with the process shown in FIG. 7.

As shown in FIG. 8, the process 500 can include a plurality of operations after supplying the inert gas from the inert gas supply to the tube at block 518. For example, in FIG. 8, the process 500 can include measuring, by the pressure sensor, a second pressure in the tube at block 530. At block 532, the process 500 can include generating a second sensor signal indicative of the second pressure measured by the pressure sensor. At block 534, the process 500 can include performing, by the control system, a second comparison of the second pressure indicated by the second sensor signal to the range of threshold values. At block 536, the process can include determining, based on the second comparison, that the second pressure indicated by the second sensor signal is within the range of threshold values. Responsive to a determination that the second pressure indicated by the second sensor signal is within the range of threshold values at block 536, the process 500 can include determining that the tube is cleared of the moisture at block 538.

Figure 9:
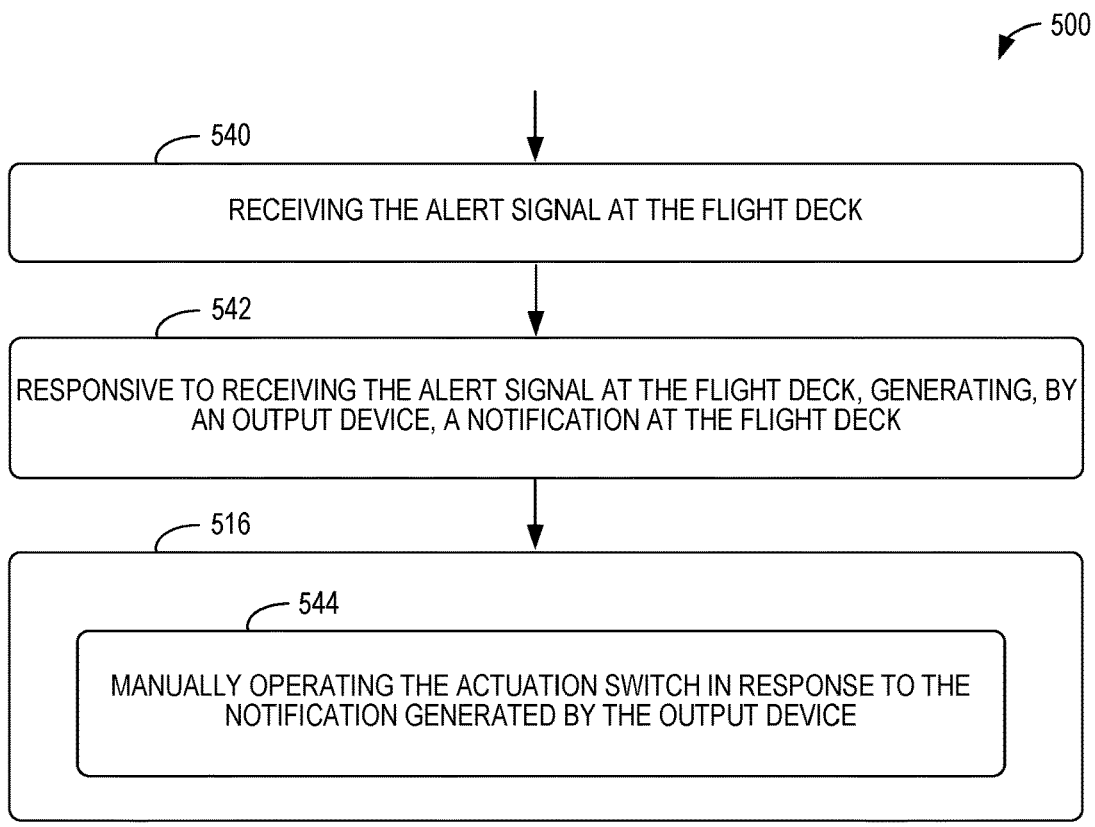
FIG. 9 illustrates a flow chart of an example process for on-board maintenance of an aircraft that can be used with the process shown in FIG. 5.

As shown in FIG. 9, the process 500 can also include receiving the alert signal at the flight deck at block 540. Responsive to receiving the alert signal at the flight deck at block 540, the process 500 can include generating, by an output device, a notification at the flight deck at block 542. The notification can include at least one of an auditory notification, a visual notification, or a haptic notification. Also, in FIG. 9, operating the actuation switch at block 516 can include manually operating the actuation switch at block 544 in response to the notification generated by the output device at block 542.

Figure 10:
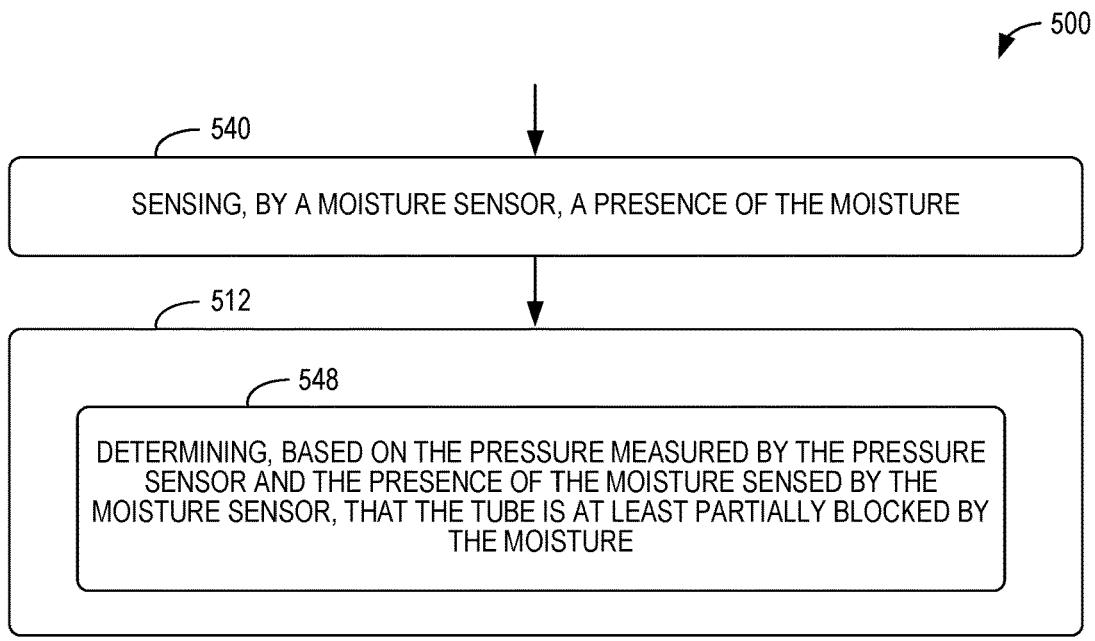
FIG. 10 illustrates a flow chart of an example process for on-board maintenance of an aircraft that can be used with the process shown in FIG. 5.

As shown in FIG. 10, the process 500 can include sensing, by a moisture sensor, a presence of the moisture in the tube at block 546. Also, in FIG. 10, determining that the tube is at least partially blocked by the moisture at block 512 can include determining, based on the pressure measured by the pressure sensor and the presence of the moisture sensed by the moisture sensor, that the tube is at least partially blocked by the moisture at block 548.

One or more of the blocks shown in FIGS. 6-10 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand

What is claimed is:

1. An aircraft on-board maintenance system, comprising:
   a pressure sensor configured to measure a pressure in a tube associated with an engine of an aircraft and generate a sensor signal indicative of the pressure measured by the pressure sensor, wherein the tube is configured to receive air into the tube at an inlet of the engine such that the pressure sensor is configured to measure the pressure as an indication of an engine inlet pressure when the tube is unblocked by moisture, wherein the pressure sensor is located in the tube;
   a valve comprising an inlet coupled to an inert gas supply on-board the aircraft and an outlet coupled to a conduit extending to the tube, wherein the valve is actuatable between: (i) an open state in which the valve supplies, via the conduit, an inert gas from the inert gas supply to the tube, and (ii) a closed state in which the valve inhibits supply of the inert gas, wherein the conduit extends from a wing of the aircraft along a pylon and along the engine to the tube;
   a control system in communication with the pressure sensor and configured to receive the sensor signal, wherein the control system is configured to:
      determine, based on the sensor signal, that the tube is at least partially blocked by moisture, and
      responsive to a determination that the tube is at least partially blocked by moisture, provide an alert signal to a flight deck of the aircraft;
   an actuation switch at the flight deck that is operable to actuate the valve to the open state to supply the inert gas to the conduit and expel the moisture in the tube; and
   a lock-out switch in communication with the control system,
   wherein the lock-out switch is configured to (i) disable the actuation switch prior to the flight deck receiving the alert signal from the control system and (ii) enable the actuation switch responsive to the flight deck receiving the alert signal from the control system.

2. The aircraft on-board maintenance system of claim 1, wherein the control system comprises:
   an electronic engine controller (EEC) in communication with the pressure sensor, wherein the EEC is configured to:
      receive an indication of the pressure measured by the pressure sensor,
      determine, based on the pressure measured by the pressure sensor, that the tube is at least partially blocked by the moisture, and
      responsive to the determination that the tube is at least partially blocked by the moisture, generate a blockage-detected signal; and
   an aircraft control system in communication with the EEC and configured to:
      receive the blockage-detected signal from the EEC, and
      responsive to the blockage-detected signal, provide the alert signal to the flight deck.

3. The aircraft on-board maintenance system of claim 1, wherein to determine that the tube is at least partially blocked by the moisture, the control system is configured to:
   perform a comparison of the pressure measured by the pressure sensor to a range of threshold values,
   determine, based on the comparison, that the pressure measured by the pressure sensor is outside of the range of threshold values, and
   responsive to a determination that the pressure measured by the pressure sensor is outside of the range of threshold values, determine that the tube is at least partially blocked by the moisture.

4. The aircraft on-board maintenance system of claim 3, wherein the pressure sensor is configured to measure a second pressure in the tube and generate a second sensor signal indicative of the second pressure measured by the pressure sensor, and
   wherein the control system is configured to:
      perform a second comparison of the second pressure indicated by the second sensor signal to the range of threshold values,
      determine, based on the second comparison, that the second pressure indicated by the second sensor signal is within the range of threshold values, and
      responsive to a determination that the second pressure is within the range of threshold values, determine that the tube is cleared of the moisture.

5. The aircraft on-board maintenance system of claim 1, further comprising an output device at the flight deck and in communication with the control system,
   wherein the output device is configured to generate a notification at the flight deck responsive to the alert signal,
   wherein the notification comprises at least one of an auditory notification, a visual notification, or a haptic notification indicating that the tube is at least partially blocked, and
   wherein the actuation switch is manually operable in response to the notification generated by the output device.

6. The aircraft on-board maintenance system of claim 1, further comprising a processor at the flight deck that is configured to automatically operate the actuation switch responsive to the alert signal received from the control system.

7. The aircraft on-board maintenance system of claim 1, wherein the inert gas supply is configured to supply the inert gas along the conduit at a pressure of at least approximately 40 pounds per square inch (PSI).

8. The aircraft on-board maintenance system of claim 1, further comprising a fitting coupling a first portion of the tube, a second portion of the tube, and the conduit,
   wherein the pressure sensor is configured to measure the pressure in the first portion of the tube, and
   wherein the fitting is configured to direct the inert gas from the conduit toward the first portion of the tube.

9. A method for on-board maintenance of an aircraft, comprising:
   measuring, by a pressure sensor, a pressure in a tube associated with an engine of an aircraft;
   determining, by a control system and based on the pressure measured by the pressure sensor, that the tube is at least partially blocked by moisture;
   responsive to determining that the tube is at least partially blocked by the moisture, providing an alert signal from the control system to a flight deck of the aircraft; and
   responsive to the flight deck receiving the alert signal from the control system, enabling, by a lock-out switch in communication with the control system, an actuation switch, wherein the lock-out switch is configured to (i) disable the actuation switch prior to the flight deck receiving the alert signal from the control system and (ii) enable the actuation switch responsive to the flight deck receiving the alert signal from the control system;

responsive to the lock-out switch enabling the actuation switch, operating the actuation switch at the flight deck to actuate a valve to an open state; and responsive to actuating the valve to the open state, supplying, via the valve and a conduit, an inert gas from an inert gas supply to the tube to expel the moisture from the tube.

10. The method of claim 9, further comprising:
prior to providing the alert signal from the control system to the flight deck, disabling using the lock-out switch, operation of the actuation switch to actuate the valve to the open state to lock the valve in a closed state.

11. The method of claim 9, wherein determining that the tube is at least partially blocked by the moisture comprises:
performing a comparison of the pressure measured by the pressure sensor to a range of threshold values;
determining, based on the comparison, that the pressure measured by the pressure sensor is outside of the range of threshold values; and
responsive to a determination that the pressure measured by the pressure sensor is outside of the range of threshold values, determining that the tube is at least partially blocked by the moisture.

12. The method of claim 11, further comprising, after supplying the inert gas from the inert gas supply to the tube:
measuring, by the pressure sensor, a second pressure in the tube;
generating a second sensor signal indicative of the second pressure measured by the pressure sensor;
performing, by the control system, a second comparison of the second pressure indicated by the second sensor signal to the range of threshold values;
determining, based on the second comparison, that the second pressure indicated by the second sensor signal is within the range of threshold values; and
responsive to a determination that the second pressure indicated by the second sensor signal is within the range of threshold values, determining that the tube is cleared of the moisture.

13. The method of claim 9, further comprising:
receiving the alert signal at the flight deck;
responsive to receiving the alert signal at the flight deck, generating, by an output device, a notification at the flight deck, wherein the notification comprises at least one of an auditory notification, a visual notification, or a haptic notification; and
wherein operating the actuation switch comprises manually operating the actuation switch in response to the notification generated by the output device.

14. The method of claim 9, further comprising:
sensing, by a moisture sensor, a presence of the moisture in the tube; and
wherein determining that the tube is at least partially blocked by the moisture comprises determining, based on the pressure measured by the pressure sensor and the presence of the moisture sensed by the moisture sensor, that the tube is at least partially blocked by the moisture.

15. An aircraft on-board maintenance system, comprising:
a pressure sensor configured to measure a pressure in a tube associated with an engine of an aircraft and generate a sensor signal indicative of the pressure measured by the pressure sensor, wherein the tube is configured to receive air into the tube at an inlet of the engine such that the pressure sensor is configured to measure the pressure as an indication of an engine inlet pressure when the tube is unblocked by moisture, wherein the pressure sensor is located in the tube;
a valve comprising an inlet coupled to an inert gas supply on-board the aircraft and an outlet coupled to a conduit extending to the tube, wherein the valve is actuatable between: (i) an open state in which the valve supplies, via the conduit, of an inert gas from the inert gas supply to the tube, and (ii) a closed state in which the valve inhibits supply of the inert gas, wherein the conduit extends from a wing of the aircraft along a pylon and along the engine to the tube;
a moisture sensor configured to sense moisture in the tube and generate a moisture sensor signal indicative of a presence of the moisture in the tube;
a control system in communication with the moisture sensor and configured to receive the moisture sensor signal, wherein the control system is configured to:
determine, based on the moisture sensor signal, that the tube is at least partially blocked by the moisture, and
responsive to a determination that the tube is at least partially blocked by the moisture, provide an alert signal to a flight deck of the aircraft;
an actuation switch at the flight deck and operable to actuate the valve to the open state to supply the inert gas to the conduit and expel the moisture in the tube; and
a lock-out switch in communication with the control system,
wherein the lock-out switch is configured to (i) disable the actuation switch prior to the flight deck receiving the alert signal from the control system and (ii) enable the actuation switch responsive to the flight deck receiving the alert signal from the control system.

16. The aircraft on-board maintenance system of claim 15, further comprising an output device at the flight deck and in communication with the control system,
wherein the output device is configured to generate a notification at the flight deck responsive to the alert signal,
wherein the notification comprises at least one of an auditory notification, a visual notification, or a haptic notification indicating that the tube is at least partially blocked, and
wherein the actuation switch is manually operable in response to the notification generated by the output device.

17. The aircraft on-board maintenance system of claim 15, further comprising a processor at the flight deck that is configured to automatically operate the actuation switch responsive to the alert signal received from the control system.

18. The aircraft on-board maintenance system of claim 15, further comprising an output device configured to provide a notification at the flight deck, wherein the notification comprises at least one of an auditory notification, a visual notification, or a haptic notification,
wherein the moisture sensor is configured to sense when the moisture is cleared from the tube and provide to the flight deck a moisture-cleared signal indicative of an absence of the moisture in the tube, and
wherein the output device is configured to, responsive to the flight deck receiving the moisture-cleared signal, provide the notification to indicate that the moisture has been expelled from the tube.

19. The aircraft on-board maintenance system of claim 15, further comprising a fitting coupling a first portion of the tube, a second portion of the tube, and the conduit, wherein the moisture sensor is configured to sense the moisture in the first portion of the tube, and wherein the fitting is configured to direct the inert gas from the conduit toward the first portion of the tube.

20. The method of claim 9, wherein supplying the inert gas comprises supplying the inert gas via the conduit extending from a wing of the aircraft along a pylon and along the engine to the tube.

* * * * *